United States Patent [19]

Hutchinson

[11] 3,850,759

[45] Nov. 26, 1974

[54] PURIFICATION OF PARTIALLY FLUORINATED CYCLOBUTANES

[76] Inventor: William M. Hutchinson, 3604 S.E. Woodland Rd., Bartlesville, Okla. 74003

[22] Filed: Oct. 23, 1973

[21] Appl. No.: 408,481

[52] U.S. Cl. .................. 203/58, 203/60, 260/648 F
[51] Int. Cl. ....................... B01d 3/36, C07c 23/06
[58] Field of Search ............. 260/648 F; 203/58, 60

[56] References Cited
UNITED STATES PATENTS

| | | | |
|---|---|---|---|
| 2,384,449 | 9/1945 | Benning et al. | 260/648 F |
| 3,345,420 | 10/1967 | Gelch | 260/648 F |
| 3,391,201 | 7/1968 | Jaeger | 203/58 |
| 3,409,512 | 11/1968 | Anello et al. | 203/60 |
| 3,449,218 | 6/1969 | Jaeger | 203/58 |

Primary Examiner—Wilbur L. Bascomb, Jr.
Attorney, Agent, or Firm—Neuman, Williams, Anderson & Olson

[57] ABSTRACT

Methyl formate, ethyl formate and propylene oxide are used as entraining agents to separate close-boiling mixtures of partially fluorinated cyclobutanes.

4 Claims, No Drawings

PURIFICATION OF PARTIALLY FLUORINATED CYCLOBUTANES

This invention relates to the separation of fluorinated hydrocarbons and particularly to the separation of fluorinated hydrocarbons having the same carbon skeleton but differing from one another in the relative numbers or position of hydrogen and fluorine atoms present in the molecule.

It is known that reaction between ethylene and tetrafluoroethylene can be effected to form 1,1,2,2-tetrafluorocyclobutane. Fluorination of the said tetrafluorocyclobutane yields octafluorocyclobutane as the ultimate product. However, there is also produced incompletely fluorinated cyclobutanes such as 1,1,2,2,3-pentafluorocyclobutane, 1,1,2,2,3,3-hexafluorocyclobutane, trans-1,1,2,2,3,3,4-hexafluorocyclobutane, heptafluorocyclobutane and cis-1,1,2,2,3,4-hexafluorocyclobutane. The fluorination mixtures can be subjected to fractional distillation to separate as relatively pure compounds a number of the components in the reaction mixture. Thus, for example, octafluorocyclobutane (B.P. −6° C.), heptafluorocyclobutane (B.P. 17° C.) and cis-1,1,2,2,3,4-hexafluorocyclobutane (B.P. 63° C.) can be readily separated by fractional distillation. However, certain materials have very close boiling points which prevent separation by straight fractional distillation. Thus, 1,1,2,2,3,3-hexafluorocyclobutane has a boiling point of 26° C. while trans-1,1,2,2,3,4-hexafluorocyclobutane has a boiling point of 27° C. Similarly, 1,1,2,2-tetrafluorocyclobutane has a boiling point of 50° C. while 1,1,2,2,3-pentafluorocyclobutane has a boiling point of 51° C.

It is an object of this invention to provide a method for the separation of pentafluorocyclobutane and tetrafluorocyclobutane mixtures by azeotropic distillation.

Another object of this invention is to provide a method for the separation of trans-1,1,2,2,3,4-hexafluorocyclobutane and 1,1,2,2,3,3-hexafluorocyclobutane by azeotropic distillation.

A further object of this invention is to provide entraining agents for azeotropic distillation of mixtures of pentafluorocyclobutane and tetrafluorocyclobutane as well as mixtures of trans-1,1,2,2,3,4-hexafluorocyclobutane and 1,1,2,2,3,3-hexafluorocyclobutane.

Other objects and advantages will become apparent from the following description of the invention.

I have discovered that pentafluorocyclobutane and tetrafluorocyclobutane can be effectively separated by fractional distillation by adding ethyl formate to the mixture prior to distillation. I have discovered further that 1,1,2,2,3,3-hexafluorocyclobutane and trans-1,1,2,2,3,4-hexafluorocyclobutane can be effectively separated by fractional distillation by adding methyl formate or propylene oxide to the mixture prior to distillation.

In accordance with one embodiment of this invention, a mixture of 1,1,2,2-tetrafluorocyclobutane and 1,1,2,2,3-pentafluorocyclobutane is subjected to azeotropic distillation using ethyl formate as an entraining agent. The minimum proportions of entraining agent is 1.7 lb./lb. 1,1,2,2,3-pentafluorocyclobutane plus 0.1 lb./lb. 1,1,2,2-tetrafluorocyclobutane. Excess entrainer did not appear beneficial. An azeotrope containing about 15 weight percent ethyl formate in tetrafluorocyclobutane boils at a temperature of about 50.2° C. at 745 millimeters pressure. Pentafluorocyclobutane remains in the kettle. The ethyl formate entraining agent can be separated from overhead or kettle product by extraction with cold sulfuric acid (70 percent). In carrying out the azeotropic distillation, rectification improves the efficiency and reflux ratios of about 5:1 with a 50 plate column to about 50:1 with a 5 plate column are preferred.

In accordance with a second embodiment of the invention, a mixture of 1,1,2,2,3,3-hexafluorocyclobutane and trans-1,1,2,2,3,4-hexafluorocyclobutane is subjected to azeotropic distillation using methyl formate as an entraining agent. The entraining agent is employed in amounts from about 0.5 to 10, preferably 1 to 3, parts per part by weight of the mixture. The 1,1,2,2,3-hexafluorocyclobutane forms an azeotrope with methyl formate containing 70 weight percent of the former and 30 weight percent of the latter, which boils at a temperature of about 27° C. at 744 millimeters pressure. The methyl formate can be separated from overhead or kettle products simply by washing with water.

In accordance with a third embodiment of the invention, a mixture of 1,1,2,2,3,3-hexafluorocyclobutane and trans-1,1,2,2,3,4-hexafluorocyclobutane is subjected to azeotropic distillation using propylene oxide as an entraining agent. The entraining agent is employed in amounts of about 1.0 to 10, preferably 2 to 5, parts per part by weight of the mixture. The azeotrope boils at about 30° C. at 744 millimeters of mercury and contains about 31 weight percent 1,1,2,2,3,3-hexafluorocyclobutane and 69 weight percent of the trans compound. The trans-1,1,2,2,3,4-hexafluorocyclobutane remains in the kettle. The propylene oxide can be separated from overhead or kettle products by washing with water.

The following examples are given to further illustrate the invention.

EXAMPLE I 429 grams of a mixture comprising approximately 92 peak height percent of 1,1,2,2-tetrafluorocyclobutane ($C_4H_4F_4$) and 8 peak height percent of 1,1,2,2,3-pentafluorocyclobutane ($C_4H_3F_5$) were charged to a still, together with 39 grams of ethyl formate. The still used comprised a 3 foot × ½ inch diameter column with silvered vacuum jacket and packed with Heli-Pak (No. 3014, Hastelloy B; 0.030 inch × 0.070 inch × 0.070 inch). The automatic take-off head was water cooled and delivered into a graduated receiver. The kettle was an insulated, 500 cubic centimeter round bottom flask heated by a mantle controlled by a Powerstat. Reflux ratios of from 20:1 to 100:1 were employed.

Data from this fractionation are recorded in Table I. The analyses were performed with a Carle Basic Gas Liquid Chromatographer using a 5 foot × ⅛ inch Carbowax 20M column at 70° C. The recording potentiometer had not integrator. The Carle Gas Liquid Chromatographer has a thermistor detector. Small cuts were usually taken and immediately analyzed by gas liquid chromatography (GLC). The chromatograms obtained with the Carle Basic Gas Chromatographer were evaluated by height of the peaks (labelled Peak Height percent). Compositions (weight percentages of each component) were obtained by dividing the peak heights by the factors 0.85, 1.08 and 1.00, respectively, for the components pentafluorocyclobutane, ethyl formate and tetrafluorocyclobutane and then normalizing the resulting figures to 100 weight percent.

separated from $C_4H_3F_5$ by azeotropic distillation using ethyl formate as entrainer. Separation of the two com-

TABLE I

| Cut No. | Overhead Temp. °C. At 744 mm Press. | Overhead gms. | Cumulative Overhead, gms. | Wt. % Distilled | Overhead Product GLC Analysis, Peak Height % | | | |
|---|---|---|---|---|---|---|---|---|
| | | | | | Lights* | $C_4H_4F_4$ | $C_4H_3F_5$ | Ethyl Formate |
| 1 | 35.0/35.8 | 1.8 | 1.8 | 0.3 | 58.4 | 36.8 | 1.6 | 3.2 |
| 2 | 35.8/38.0 | 8.2 | 10.0 | 1.9 | 68.0 | 30.0 | 0.5 | 1.0 |
| 3 | 38.0/38.4 | 1.5 | 11.5 | 2.1 | 49.7 | 47.4 | 1.2 | 0.7 |
| 4 | 38.4/38.4 | 3.3 | 14.8 | 2.8 | 48.1 | 49.2 | 0.5 | 2.2 |
| 5 | 38.4/39.8 | 3.6 | 18.4 | 3.3 | 48.5 | 49.4 | 0.1 | 2.5 |
| 6 | 39.8/40.2 | 5.7 | 24.1 | 4.5 | 43.9 | 53.8 | 0.1 | 2.2 |
| 7 | 40.2/47.2 | 6.9 | 31.0 | 5.8 | 19.5 | 74.1 | 0.1 | 6.3 |
| 8 | 47.2/48.0 | 2.4 | 33.4 | 6.7 | 11.4 | 77.0 | <0.1 | 11.5 |
| | In Dry Ice Trap | 2.4 | 35.8 | | | | | |
| | Shut Down Overnight | | | | | | | |
| 9 | 45.2/48.5 | 9.5 | 45.3 | 8.4 | 10.6 | 76.0 | 0.0 | 13.4 |
| 10 | 48.2/49.4 | 6.3 | 51.6 | 9.6 | 5.0 | 82.0 | 1.6 | 11.4 |
| 11 | 49.4/49.5 | 1.4 | 53.0 | 9.9 | 0.5 | 83.6 | 2.4 | 13.5 |
| 12 | 48.5/49.0 | 1.0 | 54.0 | 10.1 | 2.7 | 82.6 | 2.0 | 12.7 |
| | Shut down to add 39 grams Ethyl Formate which was being depleted | | | | | | | |
| 13 | 48.5/47.1 | 2.8 | 56.8 | 10.6 | 2.4 | 86.2 | 0.3 | 11.1 |
| 14 | 47.1/47.8 | 3.2 | 60.0 | 11.2 | 2.0 | 87.6 | 0.3 | 10.6 |
| 15 | 47.8/48.2 | 4.1 | 64.1 | 11.9 | 2.4 | 85.3 | 0.6 | 11.7 |
| 16 | 48.2/49.0 | 3.2 | 67.3 | 12.5 | 0.7 | 83.4 | 0.3 | 15.6 |
| | Shut Down Overnight Barometric Pressure = 745.2 mm. Hg. | | | | | | | |
| 17 | 48.2/48.7 | 3.1 | 70.4 | 13.1 | 0.7 | 85.2 | 0.7 | 13.4 |
| 18 | 48.5/49.0 | 2.1 | 72.5 | 13.5 | 0.2 | 86.2 | 1.0 | 12.6 |
| 19 | 48.8/49.6 | 3.7 | 76.2 | 14.2 | 0.6 | 87.7 | 1.2 | 11.5 |
| 20 | 49.6/50.0 | 5.3 | 81.5 | 15.2 | 0.3 | 85.3 | 1.5 | 12.9 |
| 21 | 50.0/50.0 | 2.3 | 83.8 | 15.6 | 0.0 | 83.2 | 1.6 | 15.2 |
| | Shut Down Overnight | | | | | | | |
| 22 | 50.0/50.1 | 6.5 | 90.3 | 16.8 | 0.0 | 81.6 | 2.1 | 15.2 |
| 23 | 50.1/50.1 | 9.9 | 100.2 | 18.7 | | | | |
| 24 | 50.1/50.1 | 9.5 | 109.7 | 20.4 | 0.1 | 83.2 | 0.1 | 16.6 |
| | Shut Down Overnight | | | | | | | |
| 25 | 50.1/50.1 | 40.5 | 150.2 | 28.0 | | | | |
| 26 | 50.1/50.2 | 18.5 | 168.7 | 31.4 | | | | |
| | Shut Down Over Weekend Barometric Pressure = 743.8 mm. Hg. | | | | | | | |
| 27 | 50.1/50.2 | 39.5 | 208.2 | 38.9 | | | | |
| 28 | 50.2/50.2 | 35.2 | 243.4 | 45.3 | 0.0 | 85.2 | 0.4 | 14.4 |
| | Shut Down Overnight Barometric Pressure = 744.4 mm. Hg. | | | | | | | |
| 29 | 50.2/50.2 | 59.4 | 302.8 | 56.5 | 0.0 | 86.4 | 0.1 | 13.5 |
| | Shut Down Overnight Barometric Pressure = 747.8 mm. Hg. | | | | | | | |
| 30 | 50.5/50.5 | 10.4 | 313.2 | 58.4 | 0.0 | 74.8 | 3.4 | 21.8 |
| 31 | 50.5/50.5 | 40.0 | 350.2 | 65.4 | 0.0 | 74.3 | 4.5 | 21.2 |
| | Shut Down Overnight Barometric Pressure = 751.6 mm. Hg. | | | | | | | |
| 32 | 50.6/50.6 | 19.7 | 369.9 | 68.9 | 0.0 | 73.7 | 3.7 | 22.6 |
| | Shut Down Overnight Barometric Pressure = 747.2 mm. Hg. | | | | | | | |
| 33 | 50.5/50.7 | 39.4 | 409.3 | 76.3 | 0.0 | 69.8 | 3.6 | 26.6 |
| | Shut Down Overnight Barometric Pressure = 740.0 mm. Hg. | | | | | | | |
| 34 | 50.7/51.5 | 22.3 | 431.6 | 80.5 | 0.0 | 51.2 | 6.7 | 42.1 |
| 35 | 51.2/52.0 | 6.3 | 437.9 | 81.6 | 0.0 | 46.7 | 14.0 | 39.3 |
| | Shut Down Overnight Barometric Pressure = 740.4 mm. Hg. | | | | | | | |
| 36 | 52.1/53.8 | 17.5 | 455.4 | 85.0 | 0.0 | 21.8 | 24.8 | 53.4 |
| 37 | 53.2/53.2 | 0.6 | 456.0 | 85.1 | | | | |
| | Kettle Residue | 80.0 | 536.0 | 100.0 | 0.0 | 0.08 | 31.0 | 68.7 |
| | Lost | 30.0 | | | | | | |

* 1,1,2,2,3,3-hexafluorocyclobutane and trans-1,1,2,2,3,4-hexafluorocyclobutane

The azeotropic composition was evidenced by cuts 21 through 29 wherein "lights" were absent in the overhead product and the amount of pentafluorocyclobutane was negligible. Composition of the azeotrope was determined from the peak heights to be about 15 weight percent ethyl formate and 85 weight percent 1,-1,2,2-tetrafluorocyclobutane. The azeotrope boiled at about 50.2° C. at 745 millimeters of mercury pressure. Cuts 21 through 29 also illustrate that $C_4H_4F_4$ can be separated from $C_4H_3F_5$ by azeotropic distillation using ethyl formate as entrainer. Separation of the two compounds by ordinary distillation without an entrainer was found to be impossible.

EXAMPLE II 4.2 milliliters of a mixture comprising approximately 60 peak height percent of 1,1,2,2,3,3-hexafluorocyclobutane (herein called 1H,1H) and 40 peak height percent of trans-1,1,2,2,3,4-hexafluorocyclobutane (herein called trans) were charged to a still together with 9.6 milliliters of methyl formate. The still comprised a concentric tube column (about 13 inches long, about 10 millimeters internal diameter; silvered vacuum jacket; rated 40 plates at 80 cubic centimeters per hour boil-up rate), a vacuum jacketed head with magnetic take-off and fitted with a thermocouple read by a potentiometer to 0.2° C., a conical, graduated receiver and a 25 milliliter conical kettle heated by a mantle and wrapped in glass wool. The condenser was a cold-finger type cooled by dry ice/fluorotrichloromethane. The receiver was cooled with ice when distilling the hexafluorocyclobutane. A reflux ratio of 20:1 was employed.

Data from the fractionation are recorded in Table II. The analyses were performed with a Carle Basic Gas Chromatographer using a 5 foot × ⅛ inch Carbowax 20M column at 70° C. The recording potentiometer had no integrator. The Carle Basic Gas Chromatographer Chromatographer had a thermistor detector. Small cuts were usually taken and immediately analyzed by gas liquid chromatography (GLC). The chromatograms obtained with the Carle Basic Gas Chromatographer Chromatographer were evaluated by height of the peaks (labelled Peak Height percent). Peak heights were converted to compositions, weight percent, by dividing by the factors 1.00 for trans, 1.65 for 1H,1H, and 1.13 for methyl formate and then normalizing to 100 weight percent.

cuts 5 through 8 wherein the azeotrope boiled at about 27° C. at 744 millimeters of mercury pressure and contained about 70 weight percent of the 1H,1H compound and 30 weight percent methyl formate.

EXAMPLE III 4.6 milliliters of a mixture comprising approximately 50 area percent of 1,1,2,2,3,3-hexafluorocyclobutane (herein called 1H,1H), and 50 area percent of trans-1,1,2,2,3,4-hexafluorocyclobutane (herein called trans) were charged to a still together with 12.0 milliliters of propylene oxide. The still used comprised a concentric tube column (about 13 inches long, about 10 millimeters internal diameter; silvered vacuum jacket; rated 40 plates at 80 cubic centimeters per hour boil-up rate), a vacuum jacketed head with magnetic take off and fitted with a thermocouple read by a potentiometer to 0.2° C., a conical, graduated receiver and a 25 milliliter conical kettle heated by a mantle and wrapped in glass wool. The condenser was a cold-finger type cooled by dry ice/fluorotrichloromethane. The receiver was cooled with ice when distilling the hexafluorocyclobutane. A reflux ratio of 20:1 was employed.

Data from the fractionation are recorded in Table III. The analyses were performed with an Aerograph 1520 fitted with a tris-(2-cyanoethoxy)propane column at

TABLE II

| Cut No. | Overhead Temp. °C. At 744.4 mm. Hg. | Overhead Vol., ml. | Cumulative Volume Overhead ml. | Volume % Distilled | Overhead Product GLC, Peak Height % | | | |
|---|---|---|---|---|---|---|---|---|
| | | | | | $C_4HF_7$ | 1H, 1H | Trans | Methyl Formate |
| 1 | 17.0/18.8 | 0.2 | 0.2 | 1.8 | 46 | 47 | 2 | 5 |
| 2 | 18.8/22.0 | 0.3 | 0.5 | 4.4 | 35.1 | 58.0 | 1.9 | 5.0 |
| 3 | 22.0/24.0 | 0.2 | 0.7 | 6.1 | 25 | 66 | 2 | 7 |
| 4 | 24.0/26.0 | 0.3 | 1.0 | 8.8 | 20.8 | 65.3 | 2.4 | 11.5 |
| 5 | 26.0/26.6 | 0.2 | 1.2 | 11.1 | 9.4 | 64.9 | 7.5 | 18.2 |
| 6 | 26.6/26.6 | 0.2 | 1.4 | 13.3 | 6.5 | 72.2 | 0.4 | 20.9 |
| 7 | 26.6/26.6 | 0.2 | 1.6 | 14.0 | 5.1 | 69.4 | 3.0 | 22.5 |
| 8 | 26.6/27.4 | 0.2 | 1.8 | 15.8 | 3.9 | 66.3 | 5.3 | 24.5 |
| 9 | 27.4/27.4 | 0.2 | 2.0 | 17.5 | 3.2 | 64.7 | 6.5 | 25.6 |
| 10 | 27.4/29.4 | 0.8 | 2.8 | 24.6 | 1.6 | 52.6 | 13.8 | 32.0 |
| 11 | 29.4/29.2 | 0.1 | 2.9 | 25.4 | 0.2 | 30.3 | 23.5 | 46.0 |
| 12 | 29.2/29.2 | 0.3 | 3.2 | 28.1 | 0.0 | 22.1 | 29.4 | 48.5 |
| 13 | 29.2/29.4 | 0.3 | 3.5 | 30.8 | 0.0 | 22.1 | 29.4 | 48.5 |
| 14 | 29.4/29.6 | 0.2 | 3.7 | 32.6 | 0.0 | 13.6 | 32.4 | 54.0 |
| 15 | 29.6/30.0 | 0.3 | 4.0 | 35.2 | 0.0 | 9.7 | 33.7 | 56.7 |
| Kettle Residue | | 7.4 | 11.4 | | 0.0 | 0.0 | 19.0 | 81.0 |
| Lost | | | 2.4 | | | | | |

Inspection of the peak height data (related to composition as previously explained) in Table II indicates that it is possible to separate 1H,1H from trans by azeotropic distillation using methyl formate as entrainer. Cut 1 contained little of the trans component whereas the kettle residue contained no 1H,1H. Separation of these two components by ordinary distillation was not possible. The azeotropic composition was evidenced by 50° C. and a potentiometer having a Disc integrator. The chromatograms from the Aerograph were evaluated by peak area and are labelled "area percent". Compositions in weight percentages were obtained from the peak areas by dividing the areas by the factor 1.00 for both trans and 1H,1H and by the factor 2.00 for propylene oxide and normalizing to 100 weight percent.

TABLE III

| Cut No. | Overhead Temp. °C. At 743.8 mm. Hg. | Overhead Vol., ml. | Cumulative Volume Overhead ml. | Volume % Distilled | Overhead Product GLC, Area % | | | |
|---|---|---|---|---|---|---|---|---|
| | | | | | $C_4HF_7$ | 1H, 1H | Trans | Propylene Oxide |
| 1 | 27.0/28.0 | 0.15 | 0.15 | 0.9 | 33.5 | 21.8 | <0.1 | 44.6 |
| 2 | 28.0/30.0 | 0.35 | 0.50 | 3.0 | 24.4 | 27.8 | <0.1 | 47.7 |
| 3 | 30.0/31.2 | 0.2 | 0.70 | 4.2 | 9.6 | 22.4 | <0.05 | 68.0 |
| 4 | 31.2/31.2 | 0.3 | 1.00 | 6.0 | 11.1 | 31.3 | 0.06 | 57.5 |

TABLE III — Continued

| Cut No. | Overhead Temp. °C. At 743.8 mm. Hg. | Overhead Vol., ml. | Cumulative Volume Overhead ml. | Volume % Distilled | Overhead Product | | | |
|---|---|---|---|---|---|---|---|---|
| | | | | | GLC, Area % | | | Propylene Oxide |
| | | | | | $C_4HF_7$ | 1H, 1H | Trans | |
| 5 | 31.2/31.4 | 0.2 | 1.2 | 7.2 | 8.1 | 31.2 | 0.1 | 60.6 |
| 6 | 31.4/31.8 | 0.3 | 1.5 | 9.0 | 6.7 | 30.8 | 0.2 | 62.3 |
| 7 | 31.8/32.0 | 0.3 | 1.8 | 10.8 | 4.7 | 29.4 | 0.1 | 65.8 |
| 8 | 32.0/32.0 | 0.6 | 2.4 | 14.5 | 1.9 | 27.9 | 0.2 | 70.0 |
| 9 | 32.0/32.0 | 0.4 | 2.8 | 16.9 | | | | |
| 10 | 32.0/32.2 | 0.35 | 3.15 | 19.0 | 1.6 | 26.3 | 0.3 | 71.8 |
| 11 | 32.2/32.2 | 0.5 | 3.65 | 22.0 | 1.2 | 23.6 | 0.5 | 74.7 |
| 12 | 32.2/32.6 | 0.4 | 4.05 | 24.4 | 0.6 | 21.4 | 1.0 | 77.0 |
| 13 | 32.6/32.6 | 0.7 | 4.75 | 29.6 | 0.0 | 19.1 | 1.3 | 79.6 |
| 14 | 32.6/32.6 | 0.4 | 5.15 | 31.1 | 0.0 | 17.4 | 1.6 | 81.0 |
| 15 | 32.6/33.0 | 0.4 | 5.55 | 33.4 | 0.0 | 13.5 | 4.3 | 82.2 |
| 16 | 33.0/33.2 | 0.9 | 6.45 | 38.9 | 0.0 | 8.4 | 8.8 | 82.8 |
| 17 | 33.2/33.2 | 0.5 | 6.95 | 41.9 | 0.0 | 7.8 | 8.6 | 83.6 |
| | | | Shut Down Overnight | | | | | |
| | | | Barometric Pressure = 744.4 mm. Hg. | | | | | |
| 18 | 33.0/33.0 | 0.3 | 7.25 | 43.7 | 0.0 | 4.6 | 5.5 | 89.9 |
| 19 | 33.0/33.0 | 0.2 | 7.45 | 44.9 | 0.0 | 7.7 | 9.0 | 83.3 |

Inspection of the data of Table III indicates that it was possible to distill 1H,1H overhead almost free of the trans component in the presence of propylene oxide as entrainer. The azeotropic composition was evidenced by cuts 12 through 15 wherein the azeotrope boiled at a temperature of about 32.6° C. at a pressure of 744 millimeters of mercury and contained about 69 weight percent propylene oxide and 31 weight percent of the 1H,1H component.

Those modifications and equivalents which fall within the spirit of the invention are to be considered a part thereof.

What is claimed is:

1. A process of separating a close-boiling mixture of partially fluorinated cyclobutanes containing 4 to 6 fluorine atoms which comprises subjecting said mixture to azeotropic distillation in the presence of an entraining agent selected from the group consisting of methyl formate, ethyl formate and propylene oxide.

2. A process in accordance with claim 1 wherein the close-boiling mixture is 1,1,2,2-tetrafluorocyclobutane and 1,1,2,2,3-pentafluorocyclobutane and wherein the entraining agent is ethyl formate.

3. A process in accordance with claim 1 wherein the close-boiling mixture is 1,1,2,2,3,3-hexafluorocyclobutane and trans-1,1,2,2,3,4-hexafluorocyclobutane and the entraining agent is methyl formate.

4. A process in accordance with claim 1 wherein the close-boiling mixture is 1,1,2,2,3,3-hexafluorocyclobutane and trans-1,1,2,2,3,4-hexafluorocyclobutane and the entraining agent is propylene oxide.

* * * * *

UNITED STATES PATENT OFFICE
CERTIFICATE OF CORRECTION

Patent No. 3,850,759          Dated November 26, 1974

Inventor(s) William M. Hutchinson

It is certified that error appears in the above-identified patent and that said Letters Patent are hereby corrected as shown below:

Column 1, line 17, "trans-1,1,2,2,3,3,4-hexafluorocyclobutane" should be -- trans-1,1,2,2,3,4-hexafluorocyclobutane --

Column 2, line 59, "not" should be -- no -- line 60, "has" should be -- had --

Column 5, lines 14 & 15, "Carle Basic Gas Chromatographer" should be -- Carle Basic gas chromatograph -- lines 17 & 18, "Carle Basic Gas Chromatographer Chromatographer" should be -- Carle Basic gas chromatograph -- lines 21 & 22, "Carle Basic Gas Chromatographer Chromatographer" should be -- Carle Basic gas chromatograph --

Signed and Sealed this twenty-sixth Day of August 1975

[SEAL]

Attest:

RUTH C. MASON
*Attesting Officer*

C. MARSHALL DANN
*Commissioner of Patents and Trademarks*